US009386115B2

(12) United States Patent
Schleifer et al.

(10) Patent No.: US 9,386,115 B2
(45) Date of Patent: Jul. 5, 2016

(54) SELECTION OF PROXY DEVICE FOR CONNECTION POOLING

(75) Inventors: Jason Schleifer, Cambridge, MA (US); John R. Burkhardt, Arlington, MA (US); Ransom Richardson, Beverly, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 950 days.

(21) Appl. No.: 13/156,861

(22) Filed: Jun. 9, 2011

(65) Prior Publication Data

US 2012/0317166 A1    Dec. 13, 2012

(51) Int. Cl.
*G06F 15/16* (2006.01)
*H04L 29/08* (2006.01)
*H04L 29/06* (2006.01)

(52) U.S. Cl.
CPC .......... *H04L 67/2814* (2013.01); *H04L 67/289* (2013.01); *H04L 67/38* (2013.01)

(58) Field of Classification Search
CPC ......... H04L 67/42; H04L 67/10; H04L 67/32; H04L 51/04; H04L 51/20; H04L 65/1083; H04L 41/0816; H04L 41/0893; H04L 41/509; H04L 43/10; H04L 61/6022; H04L 61/6068; H04L 63/1408; H04L 67/12; H04L 67/28; H04W 8/22; H04W 76/025; G06F 21/62; G06F 9/5027; G06F 3/162; G06F 15/16; G06Q 20/14; G06Q 30/0226; G09B 5/08; A63F 13/12
USPC ...................... 709/201–229; 726/1, 11, 12, 14
See application file for complete search history.

(56) References Cited

U.S. PATENT DOCUMENTS

| 7,801,996 | B2 | 9/2010 | Brunswig et al. |
|---|---|---|---|
| 2003/0055963 | A1 | 3/2003 | Butt et al. |
| 2004/0187133 | A1 | 9/2004 | Weisshaar et al. |
| 2008/0108437 | A1* | 5/2008 | Kaarela et al. .................. 463/42 |
| 2009/0172163 | A1 | 7/2009 | Carroll et al. |
| 2010/0251312 | A1* | 9/2010 | Albano ............... H04L 12/2801 725/78 |
| 2010/0299187 | A1 | 11/2010 | Duggal |
| 2011/0191799 | A1* | 8/2011 | Raza ...................... H04N 5/445 725/34 |

(Continued)

OTHER PUBLICATIONS

Wood, et al., "CloudNet: Dynamic Pooling of Cloud Resources by Live WAN Migration of Virtual Machines", In Proceedings of the 7th ACM SIGPLAN/SIGOPS international conference on Virtual execution environments, Mar. 9, 2011, 12 pages, 2011 ACM, Newport Beach, CA.

(Continued)

*Primary Examiner* — Ryan Jakovac
*Assistant Examiner* — Da T Ton
(74) *Attorney, Agent, or Firm* — Aaron Chatterjee; Judy Yee; Micky Minhas

(57) ABSTRACT

Methods, systems, and computer storage media are provided for communicating with client devices by way of a proxy device. An indication is received that multiple client devices are attempting to communicate with a shared service over a wide area network, such as the Internet. A server provides a first client device with a list of other client devices that are currently in communications with the shared service. Once a proxy device has been selected, the server receives an identification of that proxy device from the first client device so that the server knows that future communications from the first client device will be received through the proxy device. Data is then communicated to and from the shared service by way of the proxy device.

20 Claims, 5 Drawing Sheets

(56) References Cited

U.S. PATENT DOCUMENTS

2011/0256891 A1* 10/2011 Soliman ............... H04W 68/12
455/458
2014/0032627 A1* 1/2014 Lorenz ............... H04L 65/4076
709/201

OTHER PUBLICATIONS

Etzioni, et al., "Federated Homes: Secure Sharing of Home Services", International Symposium on Smart Home (SH 2010), Future Tech 2010, May 21-25, 2010, 6 pages, Busan, Korea. Available at: http://www.tara.tcd.ie/bitstream/2262/49881/1/federated%20home-camera-ready.pdf.

Boyce, "Understanding Windows 2000 Network Load Balancing", Aug. 23, 2001, 4 pages, Available at: http://www.techrepublic.com/article/understanding-windows-2000-network-load-balancing/5031635.

"Some thoughts on your (and my) thoughts: HTTPS for all Browsing", Retrieved on: Mar. 21, 2011, 3 pp., Available at: http://dhruvbird.blogspot.com/.

Non-Final Office Action dated Feb. 16, 2016 in U.S. Appl. No. 14/851,200, 16 pages.

* cited by examiner

SELECTION OF PROXY DEVICE FOR CONNECTION POOLING

BACKGROUND

With improved connectivity and access of computers and other devices to various networks, it has become commonplace for different programs, or clients, to share access to the same information, such as shared services, which may include data objects. Typically, for each client device attempting to access a shared service, a single network connection. In some situations, however, multiple client devices may be attempting to communicate with the same shared service, and each of these devices may be locally connected such that they communicate over a local area network. Still, in these situations, each client device utilizes its own unique communication channel through a wide area network to the shared service. This results in increased data center costs to support each device individually. This may also result in slower data transfer between each client device and the shared service.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the use of a proxy device to communicate with a shared service for multiple network connected devices all interested in communicating with the same shared service. For instance, a Smartphone, a laptop, and a gaming system may each be interested in communicating with the same gaming application available online. Each of these devices may be able to share a single Internet connection and may be able to communicate with each other by way of a local area network. In this case, instead of each of the three client devices individually communicating with the gaming application online, one of the three client devices may be selected as the proxy device, or connection pooler, such that the other two client devices communicate with the gaming application through the proxy device. This has numerous advantages, including time savings, bandwidth savings, etc. for both the client devices and the server that is associated with the gaming application. In one embodiment, the proxy device is selected by the client devices based on a list sent by the server of one or more other client devices that are currently registered with the shared service.

BRIEF DESCRIPTION OF THE DRAWINGS

The present invention is described in detail below with reference to the attached drawing figures, wherein.

DETAILED DESCRIPTION

Figure 1:
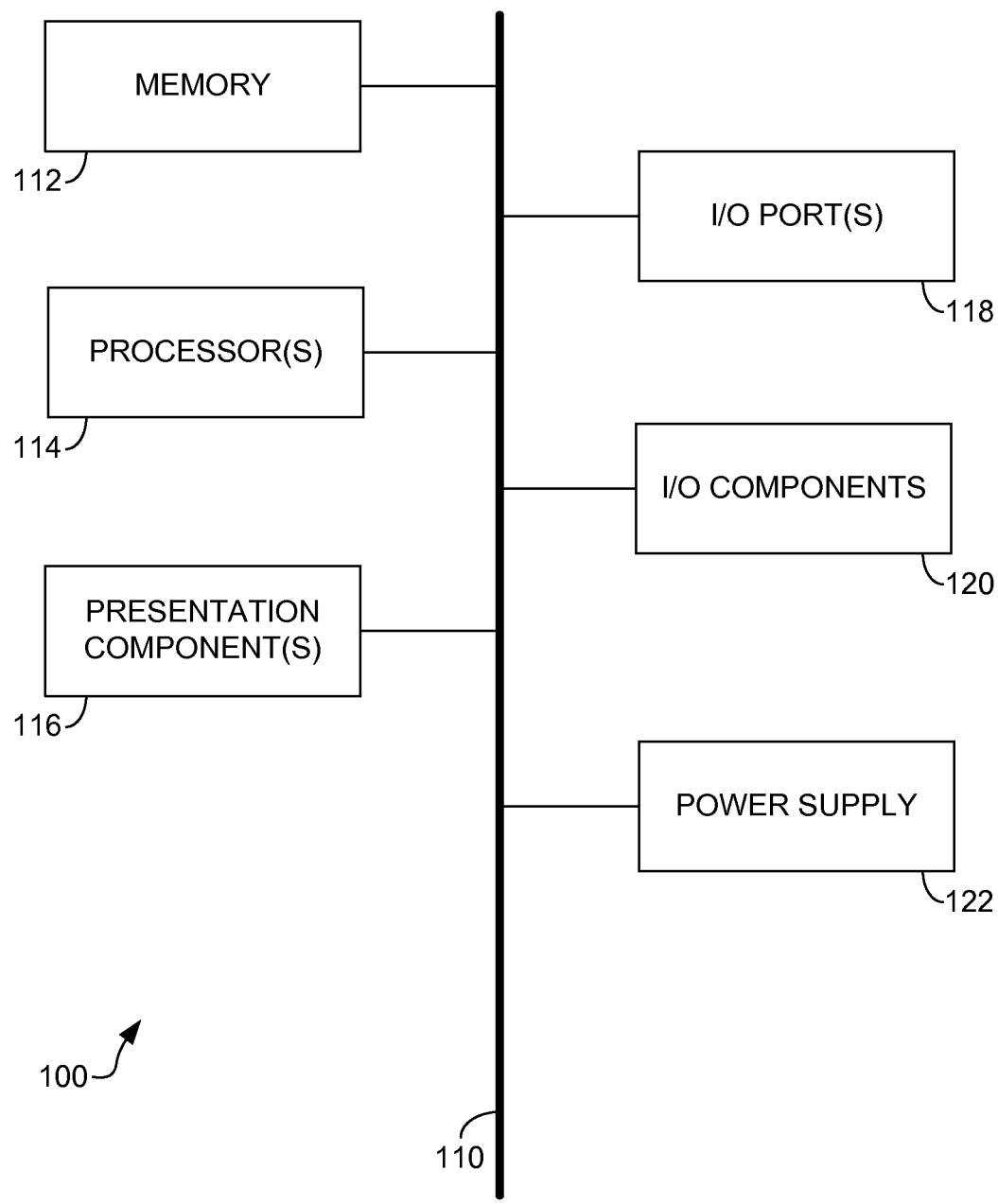
FIG. 1 depicts a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to methods and systems for the use of a proxy device or connection pooler to pool all communications from multiple other client devices when these devices are in communications with the same shared service. In one embodiment, a server associated with a particular shared service detects that two or more client devices are currently registered with, or are currently in communications with that shared service. The server may send a list of these client devices to each currently registered client device. Each client device uses this list to determine which of the other client devices in the list are locally connected to it, such as by way of a local area network. When it determines that one or more of the client devices are locally connected, those locally connected devices communicate with each other to determine which will act as the proxy device for the other client devices. In one embodiment, the server sends a list of only those client devices that are registered as proxy devices, such as if they have previously acted as a proxy device for other client devices or if they are physically suited to operate as a proxy device. A device may be physically suited if it is hard wired to the network, is not running on a battery, has a lower latency connection than other connections, such as a Wi-Fi network care, for example.

Accordingly, in one aspect, an embodiment of the present invention is directed to one or more computer storage media storing computer-useable instructions that, when used by one or more computing devices, cause the one or more computing devices to perform a method of communicating with two or more client devices by way of a proxy device. The method includes determining an identification of a proxy device that will communicate with a shared service on behalf of two or more client devices. The two or more client devices comprise the proxy device, and the determination of the identification of the proxy device indicates to the shared service that future communications from a first client device of the two or more client devices will be received from the proxy device. Further, the method includes communicating data from the shared service to the first client device by way of the proxy device through a wide area network.

In another embodiment, an aspect of the invention is directed to one or more computer storage media storing computer-useable instructions that, when used by one or more computing devices, cause the one or more computing devices to perform a method of communicating with two or more client devices by way of a proxy device. The method includes determining that the two or more client devices are interested in communicating with a shared service that is accessible via a wide area network by the two or more client devices. The two or more client devices are locally connected such that they can communicate with each other. The method also includes providing to each of the two or more client devices identifications of other client devices that have also provided an indication to a server of being interested in communicating with the shared service and that can be used as a proxy device. Each of the other client devices is in a same session of the shared service as the two or more client devices. Further, the method includes receiving an identification of the proxy device from each of the two or more client devices, wherein the proxy device is selected from the other client devices and communicating with the two or more client devices by way of the proxy device.

A further embodiment of the present invention is directed to one or more computer storage media storing computer-useable instructions that, when used by one or more computing devices, cause the one or more computing devices to perform a method of communicating with a shared service by way of a proxy device. The method includes, at a first client device, providing a server associated with the shared service an indication that the first client device is interested in communicating with the shared service and receiving from the server a list of other client devices that are also interested in communicating with the shared service. The method also includes determining which of the other client devices are locally connected to the first client device. Further, the method includes selecting from the other client devices that are locally connected to a proxy device that is used by the first client device to communicate with the shared service and communicating data to the shared service by way of the proxy device.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
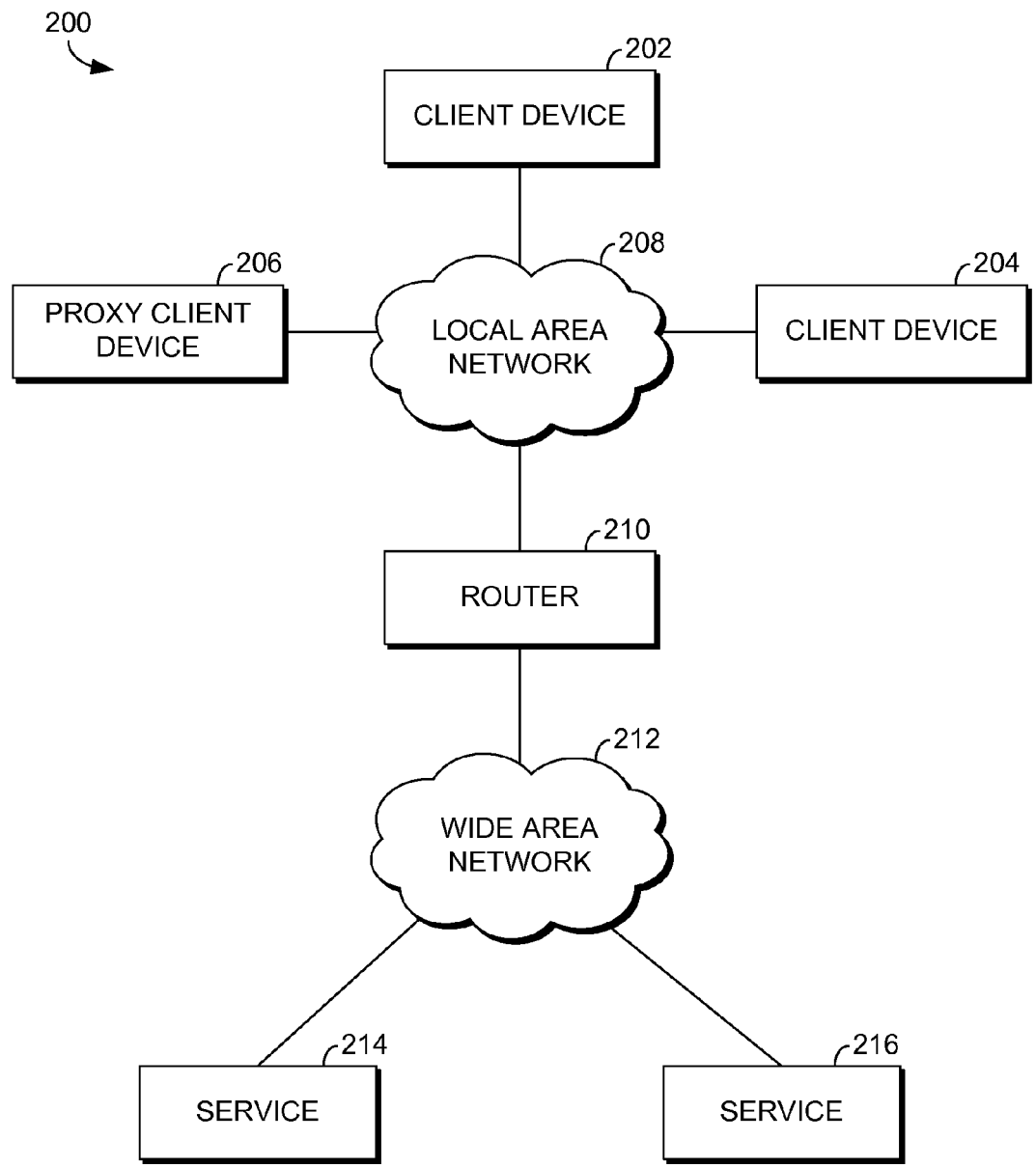
FIG. 2 depicts a block diagram that illustrates a computing environment suitable for embodiments of the present invention.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein. Among other components not shown, the system 200 includes client devices 202 and 204 and a proxy device 206 that communicate with each other by way of a local area network 208. The system 200 also includes services 214 and 216 that communicate with the client devices 202 and 204 and the proxy device 206 by way of the wide area network 212 which, in one embodiment, is the Internet. In one embodiment, the local area network 208 and the wide area network 212 communicate with each other by way of a router 210. The local area network 208 may include, without limitation, one or more local area networks (LANs). The wide area network 212 may include, without limitation, one or more wide area networks (WANs), such as the Internet. Such networking environments are commonplace in offices, enterprise-wide computer networks, intranets, and the Internet. Accordingly, the local area network 208 and the wide area network 212 are not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, client devices, or the like.

With continued reference to FIG. 2, each of client devices 202 and 204, proxy device 206, and services 214 and 216 may be any type of computing device, such as computing device 100 described with reference to FIG. 1, for example. As mentioned, client devices 202 and 204 and proxy device 206 may communicate with each other via the local area network 208, and these client devices may communicate with the services 214 and 216 by way of the wide area network 212. The services 214 and 216, in one embodiment, are run on a server, which may be operated by a developer of the service. A service, as used herein, is any type of program that is accessible to clients or users via the Internet, and may include, for exemplary purposes only, applications (e.g., weather applications, gaming applications), location-based services, data objects, etc. It should be understood that any number of client devices and services may be employed within the system 200 within the scope of the present invention. Each may comprise a single device or multiple devices cooperating in a distributed environment. For instance, each service 214 and 216 may comprise multiple components that assist to perform the functions of a service. Additionally, other components not shown may also be included within the system 200, while components shown in FIG. 2 may be omitted in some embodiments.

The client devices 202 and 204 and the proxy device 206 may be any type of computing device owned and/or operated by a client that can access the local area network 208. For instance, each of the client devices 202 and 204 and the proxy device 206 may be a desktop computer, a laptop computer, a tablet computer, a mobile device, a gaming system, or any other device having network access. Generally, a client may employ the client devices 202 and 204 and the proxy device 206 to, among other things, send and receive data from the network when using a particular service, such as services 214 and 216. For instance, client device 202 may be a gaming system that is able to connect to the Internet to access a certain game online, such as service 214 or 216. The client device 202 may alternatively be a computing system that is attempting to access a game, weather application, social media website, etc., and may access such service by way of the wide area network 212.

As will be discussed further herein, the client devices 202 and 204 and the proxy device 206 communicate with each other via the local area network 208, and as such these client devices may be physically located in close proximity, even in the same room or building. While typically each of these client devices 202, 204, and 206 would communicate through the wide area network 212 individually to access particular services, embodiments of the present invention allow for the communication to be routed through just one of the devices, such as the proxy device 206, when these devices are attempting to access the same service. Here, the proxy device 206 is chosen or volunteers to act as the proxy communicator for one or more of the other devices connected to the local area network 208. For instance, if client device 202 is attempting to access service 214 through the network and proxy device 206 is also attempting to access service 214, client device 202 may send its communications to the proxy device 206 first, which will then communicate through the wide area network 212 to the service 214 on behalf of the client device 202. Utilizing a proxy provides many benefits on both the client side and the server (service) side. For instance, in the context of a chat application or an instant message program, each client device may continuously send a request to the application's server requesting data from the other client device with which the client device is communicating. As such, as soon as the client device receives a message, another request is immediately sent to the server until another message is received. Utilizing a proxy device uses less bandwidth, which saves the server many resources that it would be using elsewhere. Additionally, if each device is individually communicating to the server with its own connection, many resources on the server's side are needed to support these multiple individual connections, which can be avoided if they are pooled together in a single connection.

To better illustrate embodiments of the present invention, an exemplary scenario may involve multiple network connected devices that are each interested in communicating with the same remote service. For example, a Smartphone, a laptop computing device, and a gaming system may all be communicating to a chat service. While the service is located at a remote location, each of these devices is located on the same local-subnet. They can all communicate with each other over the local intranet, such as the local area network 208. The local devices may be able to detect that they are on the same local subnet. They would then elect a single device to act as the conduit or proxy to the service in the cloud. The service is then notified as to the identity of the proxy device so that messages are correctly routed in both directions. At this point, all traffic to the service would flow to the service through the proxy device, such as the proxy device 206. As such, all incoming and outgoing messages or other communications to/from the client devices and the service would be routed through the proxy device 206. The messages would all be multiplexed into a single communication channel up to the server and back down from the server. This single communication channel may even provide faster and more reliable connectivity options than the clients are able to achieve individually. For example, browser code is limited to HTTP communication, but the proxy running on a desktop computing device or a gaming system, for example, may make a persistent TCP connection to the server, which the browser could use by communicating with the proxy device using HTTP.

Figure 3:
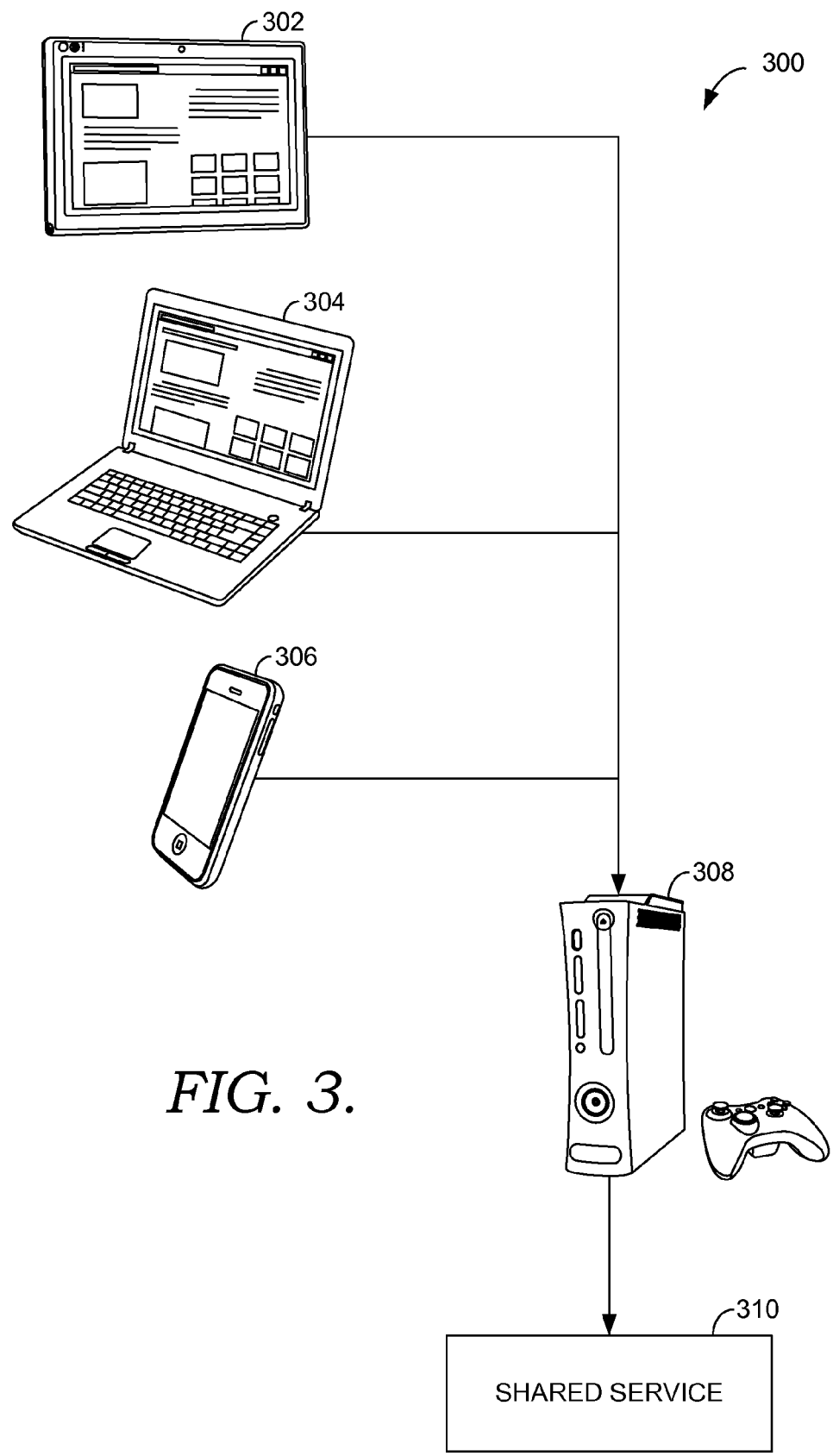
FIG. 3 depicts a block diagram illustrating multiple network connected devices routing data through a connection pooler, in accordance with embodiments of the present invention.

Turning to FIG. 3, a block diagram is illustrated of multiple client devices in communication with a shared service by way of a proxy device. This block diagram is generally referred to as system 300. As mentioned, multiple client devices may be able to communicate with one another if they share a single Internet connection, or if they are connected via a local area network. Tablet computing device 302, laptop 304, Smartphone 306, and gaming system 308 illustrated in FIG. 3 communicate with the same local area network (not shown), and as such are able to communicate with each other. Here, the gaming system 308 has been selected as the device to act as a communication proxy for the other devices. There are many ways that a proxy device is selected. All are considered to be within the scope of the present invention. For exemplary purposes only and not limitation, in one embodiment, the proxy device is selected by the clients themselves. But in another embodiment, the proxy device is selected by the server, such as the server associated with the particular service that the device is attempting to access. In yet another embodiment, both a server on the service side and the client devices wanting to access that service make the decision as to which device will act as the communication proxy.

In one instance, the proxy device may be selected based on it being able to better communicate with the service's server than the other client devices. For instance, a TCP connection may provide for better and faster communication with the server than an HTTP communication. Generally, TCP communication is a more efficient communication protocol than HTTP. A connection speed of each client device may also be used to make this determination. Further, the determination may be made based on whether each device is currently using a wired or wireless connection to the network. Additionally, one device may be currently in communication with several services or may have several applications open, but another may not have any other than the service with which it is currently trying to communicate. As such, a device with a smaller load may be better suited to efficiently act as the proxy device rather than a device that is perhaps slower at the current time because it is utilizing several applications or services simultaneously.

In one embodiment, the server associated with the service is aware of the client devices with which it is currently communicating, or which devices are currently registered to communicate with that particular service. At this point, the client devices are each individually communicating with the service. The service or its associated server may alert each of these client devices of each other and that each of these devices is currently using the same resource, or the same service. The UPNP, an open protocol for universal communication, TCP connection, etc., are ways for the devices to communicate with each other and determine which device will be the connection pooler, or the proxy connection device. The selection of the proxy device may be random or may be ordered. In one embodiment, the server associated with the service is aware of which devices have previously acted as a proxy device, and tells the other devices this information. This may assist the client devices in making the selection of a proxy device.

Returning to FIG. 3, in the scenario described above, the Smartphone 306 would receive a list from the service's server as to which locally connected client devices have previously acted as the proxy. Here, the Smartphone 306 may have the capability to look through the list of devices provided by the service's server to determine which it has the capability of communicating with (e.g., which share the same Internet connection or which communicate with the same local area network). The Smartphone 306 would notice the gaming system 308 on the list and may attempt to communicate with the gaming system 308 to confirm or request that the gaming system 308 act as the proxy for their communication with the shared service 310. A message would then be communicated to the service's server indicating that the Smartphone's 306 data will be communicated to the shared service 310 via the gaming system 308. This message may be communicated by either the Smartphone 306 or the gaming system 308. For example, in one embodiment, the proxy device provides an indication to the shared service 310 that it will be the proxy. But in another embodiment, another device not acting as proxy provides the indication to the shared service. Once the shared service 310 is aware that the Smartphone's 306 communication will go through the gaming system 308, data may be communicated bidirectionally both to and from the shared service 310 to the Smartphone 306. As such, data is both pushed to the shared service 310 and pulled from the shared service 310.

In one embodiment, a service may break up current registered users by session. Devices in each session may be local in relation to each other, for example. As such, the server, when it communicates the identity of other devices currently registered with a particular service, may just communicate the identity of the devices that are in the same session, as those may be the devices that are locally connected to that particular device. This may assist the laptop 304 for instance, in determining the devices that are locally connected and that may act as the proxy device.

Figure 4:
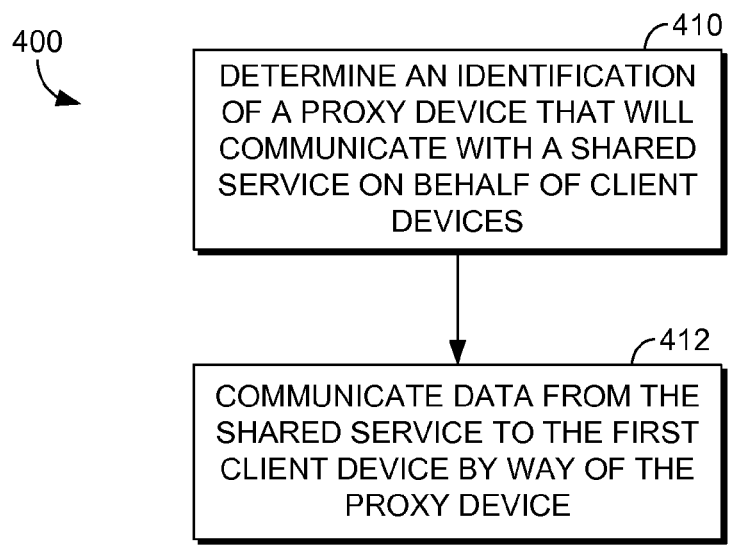
FIG. 4 illustrates a flow diagram showing a method for communicating with two or more client devices by way of a proxy device, in accordance with an embodiment of the present invention.

FIG. 4 illustrates a flow diagram showing a method for communicating with two or more client devices by way of a proxy device, in accordance with an embodiment of the present invention. Initially, it should be mentioned that FIG. 4 is from the shared service's point of view. More specifically, a server associated with a particular shared service is likely the computing device performing the steps shown in FIG. 4. At step 410, a determination is made as to the identification of a proxy device that will communicate data between the shared service and two or more client devices. In one instance, the proxy device is one of the client devices such that the proxy device and the client device are both communicating with the same shared service through the proxy device. This allows just one communication stream to be sent to and from the shared service for both of the devices. As previously discussed the determination or selection of the proxy device may be made by the client devices themselves or by the server associated with the shared service. Alternatively, the determination may be made by a combination of the client device and the server. For example, if there are three locally connected client devices each attempting to access the same shared service, the third of the three client devices may be selected by the other client devices as the proxy device.

In one embodiment, when made by the proxy devices in combination with the server, an indication is received that the client devices are attempting to communicate with a shared service, typically by way of a wide area network, such as the Internet. A shared service, as previously mentioned, is any type of program that is accessible to multiple clients or users via the Internet, and may include, for exemplary purposes only, applications (e.g., weather applications, gaming applications), location-based services, shared data objects, etc. Once the server is aware that the client devices are attempting to communicate with it, or are interested in communicating with it, the server may determine that the client devices are locally connected such that they are capable of communicating with one another by way of a local area network. In this embodiment, the server provides a first client device with a list of other client devices currently communicating with the shared service. In one instance, these other client devices may be currently registered with that shared service, indicating that they are also attempting to communicate with the shared service. In one embodiment, the other client devices may even be in the same session as the first client device.

In embodiments, the list of other client devices provided to the client devices may include only those client devices that are registered as proxy devices, such as if these devices have previously acted as the proxy device for one or more other client devices. The server may monitor those devices that act as proxy devices so that they can be suggested in the future when a proxy device is requested. The other client devices provided to the first client device may be only those that are locally connected to the first client device. Alternatively, the other client devices may not all be locally connected, leaving it up to the first client device to attempt to contact the other client devices to determine if they are locally connected or not. When the determination of a proxy device is made by the client devices alone, a LAN discovery protocol may be used without the assistance of the server. Or, based on information the server knows about the client devices, it may make the determination or selection of the proxy device without the assistance of the client devices.

As such, in one embodiment, an identification of the proxy device is received by the server. In one embodiment, this identification is received from the first client device. Alternatively, the identification may be received from the selected proxy device itself. Even further, the identification may be received at the server from both the first client device and the proxy device. The received indication of the proxy device indicates to the server that future communications from the first client device will be received from the proxy device. In one instance, the selected proxy device is one of the client devices that had attempted to communicate with the shared service. As mentioned, there are many ways that a proxy device may be selected. For instance, a proxy device may be selected based on a connection type (e.g., TCP or HTTP), a speed of each of the two or more client devices (e.g., Smartphones may have a slower connection speed than a gaming system), other communications or applications currently in progress on each of the client devices, whether the client devices are wired or wirelessly connected to the wide area network (e.g., hardwire or Wi-Fi), or by random selection. These factors are exemplary in nature, and thus are not meant to limit embodiments of the present invention. Further, the proxy device may be selected by the client devices using a LAN discovery protocol such that the server or shared service is not involved in any way with the selection of the proxy device. While the proxy device selection is described above as being done by the client devices, in one embodiment, proxy device selection is done by the server. Here, the server would simply select the proxy device based on information it knows about the registered devices and notify the other locally-connected devices about this proxy relationship.

At step 412, data is communicated from the shared service to the first client device by way of the proxy device. The communication of data is bidirectional such that data is sent to and from the shared service to the first client device by way of the proxy device. Because the proxy device and the first client device are both in communication with the shared service, a single connection is shared between the two devices through the wide area network to the shared service. Here, the shared service or its associated server receives only a single communication stream from the proxy device when the proxy device is communicating with the shared service on behalf of itself and the first client device. While a first client device is described here, it is contemplated to be within the scope of the present invention that multiple other devices may utilize the same proxy device for communication with a shared service. This scenario is shown in FIG. 3 herein.

Figure 5:
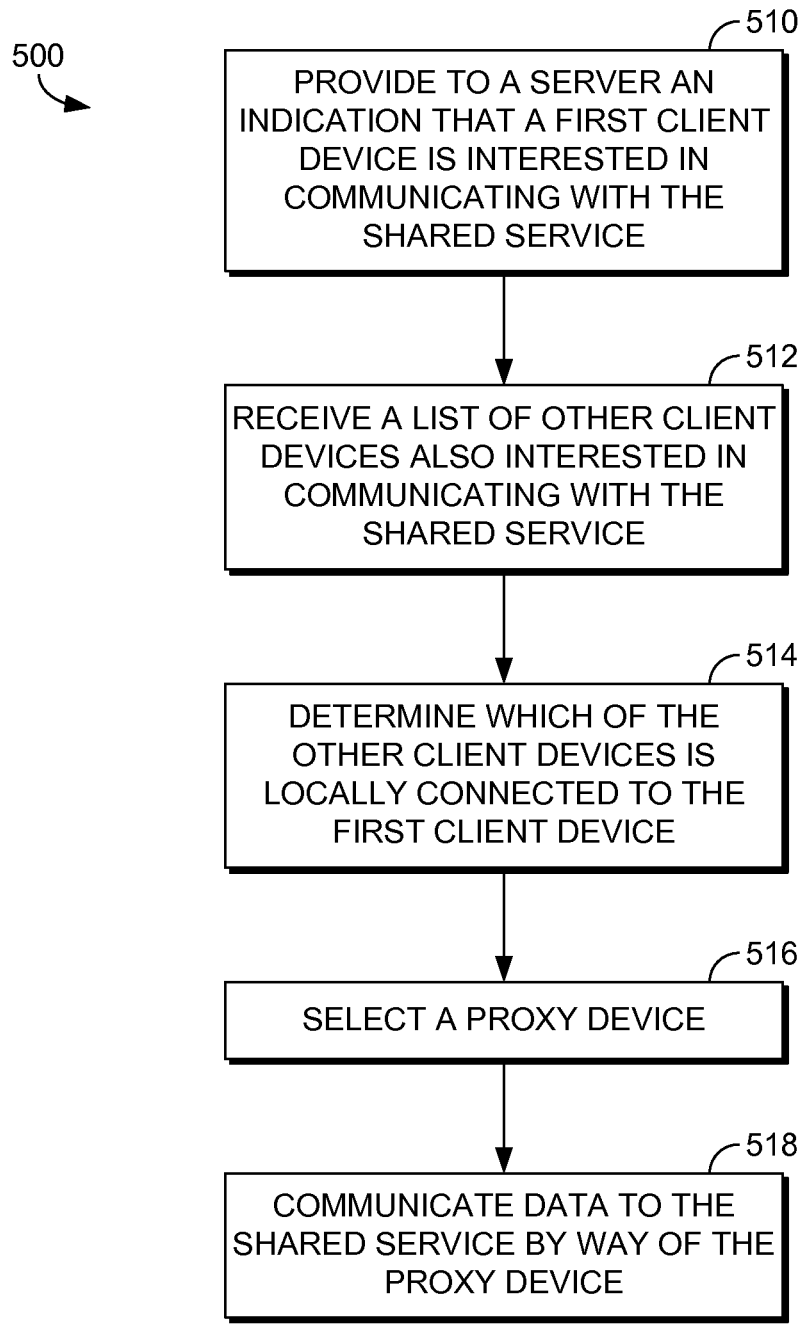
FIG. 5 illustrates a flow diagram showing a method for communicating with a shared service by way of a proxy device, in accordance with an embodiment of the present invention.

Turning now to FIG. 5, a flow diagram showing a method for communicating with a shared service by way of a proxy device is illustrated, in accordance with an embodiment of the present invention. Initially at step 510, a first client device provides a server with an indication that it is interested in communicating with the shared service. This indication may be an actual communication of data in one embodiment, or a registration request with the shared service in another embodiment. At step 512, a list of other client devices also interested in communicating with the shared service is received by the first client device (e.g., those client devices that are currently registered with the shared service). It is determined at step 514 which of the other client devices is locally connected to the first client device. As mentioned, the server, in one embodiment, sends the first client device a list of only those client devices that are locally connected to the first client device. Alternatively, the server may not have the information to know which are locally connected, and thus the other client devices may not all be locally connected.

At step 516, a proxy device is selected from the list of other client devices. The selected proxy device is a client device that is determined to be locally connected to the first client device such that the devices are able to communicate by way of a local area network. This selected proxy device uses a single communication stream to communicate its data and data from the first client device to the shared service via a wide area network, such as the Internet. The proxy device is also used to receive data intended for the first client device. At step 518, data is communicated to the shared service by way of the proxy device.

As can be understood, embodiments of the present invention provide for utilization of a proxy device to communicate with a service for one or more client devices. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer memories storing computer-useable instructions that, when executed by one or more computing devices, cause the one or more computing devices to perform a method of communicating with two or more client devices by way of a proxy device, the method comprising:

determining, at a remote server, that two or more client devices are currently connected to a shared service associated with the remote server;

generating a list of the two or more client devices;

transmitting the list to a client device of the two or more client devices for the client device to determine which of the two or more client devices are locally connected to the client device;

selecting, by the remote server, the proxy device from first client device and other client devices on the list that are attempting to communicate with the shared service and are determined to be locally connected to the first client device, where the proxy device will communicate with the shared service on behalf of the two or more client devices, and wherein the determination of the identification of the proxy device indicates to the shared service that future communications from the two or more client devices will be received from the proxy device, and that future communications to the two or more client devices will be transmitted to the proxy device; and communicating data from the shared service running on the remote server to at least one of the two or more client devices by way of the proxy device through a wide area network.

2. The one or more computer memories of claim 1, further comprising determining that the two or more client devices are locally connected by way of a local area network.

3. The one or more computer memories of claim 1, wherein the determining further comprises:

receiving an indication that the two or more client devices are attempting to communicate with the shared service by way of the wide area network; and providing to a first client device of the two or more client devices a list of other client devices that are currently communicating with the shared service.

4. The one or more computer memories of claim 1, wherein the identification of the proxy device indicates that one of the two or more client devices previously acted as the proxy device.

5. The one or more computer memories of claim 4, wherein the proxy device is selected based on one or more of,
(1) a connection type,
(2) a speed of each of the two or more client devices,
(3) other communications currently in progress on each of the two or more client devices,
(4) whether the two or more client devices are wired or wirelessly connected to the wide area network, or
(5) a random selection.

6. The one or more computer memories of claim 3, wherein the first client device and the proxy device share a single connection to the shared service by way of the wide area network.

7. The one or more computer memories of claim 3, wherein the other client devices provided to the first client device are in a same session as the first client device.

8. The one or more computer memories of claim 1, wherein the remote server monitors which client devices are registered as proxy devices.

9. The one or more computer memories of claim 3, wherein the list of the other client devices is comprised of the other client devices that are registered as proxy devices.

10. The one or more computer memories of claim 1, wherein the shared service receives a single communication stream from the proxy device when the proxy device is communicating with the shared service on behalf of itself and the first client device.

11. The one or more computer memories of claim 1, wherein the determination of the identification of the proxy device is made by the remote server such that the remote server notifies the two or more client devices as to an identity of the proxy device.

12. A computer-implemented method, the method comprising:

determining at a remote server that a first client device is attempting to communicate with a shared service running on the remote server;

generating, at the remote server, a list of other client devices that are also attempting to communicate with the shared service via the remote server;

transmitting the list of the other client devices to the first client device;

receiving an indication from the first client device as to which of the other client devices on the list are locally connected to the first client device;

selecting, by the remote server, a proxy device from the first client device and the other client devices that are attempting to communicate with the shared service and are determined to be locally connected to the first client device, wherein the proxy device facilitates communication with the shared service; and communicating data to the first client device and the other client devices by way of the proxy device.

13. The method of claim 12, further comprising receiving data from the first client device and the other client devices by way of the proxy device.

14. The method of claim 12, wherein the first client device and the proxy device communicate with each other by way of the local area network.

15. The method of claim 12, wherein the first client device and the proxy device share a single communication stream to the shared service by way of a wide area network, and wherein the wide area network is the Internet.

16. A system for communicating with two or more client devices by way of a proxy device using a single communication stream, the system comprising:

a processor; and one or more computer-readable media storing computer-usable instructions, that when used by the processor, cause the processor to:

provide an indication to a remote server that a first client device is attempting to communicate with a shared service running on a remote server;

in response to the provided indication, receive from the remote server a list of other client devices that are also attempting to communicate with the shared service via the remote server;

at the first client device, determine which of the other client devices on the list are locally connected to the first client device;

select, by the remote server, a proxy device from the other client devices that are attempting to communicate with the shared service and are determined to be locally connected to the first client device, wherein the proxy device facilitates communication with the shared service for the first client device and for the other client devices;

communicate data to the proxy device, the data intended for the shared service running on the remote server; and receive data from the proxy device, the data originating from the shared service running on the remote server.

17. The system of claim 16, wherein one or more computer-readable media storing computer-usable instructions cause the processor to:
select, by the remote server, a proxy device from the other client devices, wherein the proxy device is running fewer applications than the other client devices.

18. The system of claim 16, wherein the shared service communicates with the two or more client devices through the proxy device using a single communication stream.

19. The system of claim 16, wherein one or more computer-readable media storing computer-usable instructions cause the processor to:
receive, from the proxy device and on behalf of the two or more client devices, a single communication stream.

20. The system of claim 16, wherein one or more computer-readable media storing computer-usable instructions cause the processor to:
select, by the remote server, a proxy device from the other client devices, wherein the proxy device uses a communication protocol for communicating with the remote server that is more efficient than communication protocols used by the other client devices.

\* \* \* \* \*